United States Patent [19]

Shannon et al.

[11] Patent Number: 5,537,594
[45] Date of Patent: Jul. 16, 1996

[54] QUERY PROCESSING IN A MOBILE COMMUNICATIONS SYSTEM HOME LOCATION REGISTER

[75] Inventors: John P. Shannon, Maidenhead, United Kingdom; John P. Prokopenko, Stittsville; Michelle A. Beaudry, Manotick, both of Canada

[73] Assignee: Northern Telecom Limited, Montreal, Canada

[21] Appl. No.: 109,155

[22] Filed: Aug. 19, 1993

[30] Foreign Application Priority Data

Aug. 19, 1992 [GB] United Kingdom ............... 9217569

[51] Int. Cl.$^6$ ........................................... G06F 7/02
[52] U.S. Cl. ........................... 395/650; 364/DIG. 1; 364/DIG. 2; 364/222.2; 364/222.4; 364/282.1; 364/919; 364/919.2; 364/919.4; 364/974; 364/974.6
[58] Field of Search .................. 364/Dig. 1, Dig.2; 395/200, 375, 600, 650, 200.01, 200.03; 379/58, 59.6

[56] References Cited

U.S. PATENT DOCUMENTS 5,054,110  10/1991  Motorola ................................. 455/33

FOREIGN PATENT DOCUMENTS 295022   6/1988  European Pat. Off. .
8604764  8/1986  WIPO .

OTHER PUBLICATIONS

IEE Journal on Selected Areas in Comunications. vol. 7 No. 3 Apr. 89. pp. 418–423. K. Murakami et al. 'Control Architecture for Next–Generation Communication Networks Based on Distributed Databases'.
IBM Technical Disclosure Bulletin vol. 33 No. 12, May 1991 pp. 113–120 Armonk (US) 'Technique for Replicating Distributed Directory Information'.
International Switching Symposium 1990 vol. 6, 28 May 1990, Stockholm (SE) pp. 161–167 M Wizgall et al 'The ISDN Approach for Mobile Radio'.

*Primary Examiner*—Robert B. Harrell
*Attorney, Agent, or Firm*—Lee, Mann, Smith et al.

[57] ABSTRACT

A communications system query processing element, for example a home location register for a mobile communications system, includes a plurality of application processors. First data such as permanent data relating to a plurality of mobile subscribers (subscription information etc.) is available at all application processors, whereas second data such as temporary data relating to the plurality of subscription is partitioned between the application processors. Queries are allocated via a transaction bus to an available application processor. If it is not the correct one for the subscriber originating the query, it is redirected via the transaction bus. This arrangement permits a linear growth in terms of database to be achieved with increasing numbers of subscribers by the addition of application processors as necessary and in a manner not involving a processing bottleneck.

5 Claims, 3 Drawing Sheets

PRIOR ART

QUERY PROCESSING IN A MOBILE COMMUNICATIONS SYSTEM HOME LOCATION REGISTER

BACKGROUND OF THE INVENTION

This invention relates to communication systems, such as mobile communications and in particular but not exclusively to the GSM Public Land Mobile Network (PLMN).

The term GSM refers to the standards for pan-European mobile cellular radio telephony systems at 900 MHz defined by a CEPT standards group called Groupe Speciale Mobile. This has been adopted by ETSI and GSM has come to represent Global Systems for Mobile Communication. A basic GSM network architecture is illustrated schematically in FIG. 1. The GSM network basically comprises a base-station system (BSS) which includes a base-station controller (BSC) and one or more base-station transceiver stations (BTS), associated with each mobile services switching center (MSC) (only one BSC is illustrated), a home location register (HLR) and a visitors location register (VLR). Every subscriber (mobile station MS) is allocated to a home network, and possibly an MSC within that network, this being achieved by making an entry in the HLR. Whenever a mobile is switched on and at regular intervals thereafter, it will register with the system and give its location area (group of cells). If the mobile is not in its home area, the subscriber's data will be added to the VLR of the then local MSC. The MCSs attend to the routing of calls to their destinations, each MSC being connected to other MSCs, and Gateway MSCs (GMSC) having interfaces for connection to PSTNs (Public Switched Telephone Networks) and other service providers, and network management etc. functions (NMC, OMC).

The key network principles of GSM are standardisation of network components; the separation of network components by standard interfaces; a network infrastructure based on the Intelligent Network (IN) principles of centralised databases which contain all information about subscribers in the network; and the use of a common radio interface based on ISDN signalling capabilities to provide advanced voice and data services.

The HLR is a central component in the IN infrastructure of the GSM PLMN. It is a centralised database which contains subscription information, service activation information and current location information for each subscriber within the network. There are two other centralised databases, the Authentication Center (AUC) and the Equipment Identification Register (EIR). The AUC provides the keys for maintaining the security of subscribers' identities and for encrypting information passed over the air interface, whereas the EIR is used to control access to the network by unapproved, stolen or faulty mobile stations. The AUC may be considered to be part of an HLR which provides both HLR and AUC functioning, as may the EIR be so considered. The information contained within the HLR allows a mobile subscriber to be addressed by a unique directory number independent of geographical location. Thus, mobile stations are able to roam freely within networks and from one network to another. The HLR handles transactions with both the MSC and the VLR, which either request information from the HLR, or update the information currently held in the HLR. The HLR also initiates transactions with the VLR to complete incoming calls and update subscriber data.

As mentioned basic GSM operates at 900 MHz, however, there are other mobile telephony systems based on GSM standards but implemented at the 1.7–2.3 GHz range. Personal Communication Networks (PCN) are one such system and are known as DCS 1800 (Digital Cellular System at 1800 MHz). The HLR with which the present invention is concerned is applicable to GSM and PCN and also to other mobile systems which are not GSM based.

The HLR is the central point within the network upon which all call routing and service delivery depends. The GSM network cannot serve subscribers without an HLR since the HLR contains the subscriber provisioning information. The network cannot terminate any calls without the HLR since it contains the location information. The MSC cannot offer more subscriber services than those which are provisioned within the HLR as there is no mechanism by which to provide the subscription information to the MSC other than via the HLR.

In the case of a small network, i.e. one with few subscribers, an HLR database having a single query processor can suffice. The HLR database is connected to the MSC and the rest of the network through a Signalling System such as a CCS7 signalling network. The single processor contains all of the subscribers' subscription information (permanent data PD) and also all of the temporary information (TD) relating to service activation and current location. The HLR provides the network with facilities for examining the permanent data (PD) and examining and modifying the temporary data (TD). These facilities are provided as Network Functions which are realised as sequences of messages. The network functions which are provided by the HLR include the following, (no specific details are given since they are specified in GSM, for example): Incoming Call Handling; Outgoing Call Handling; Supplementary Services Management; Location Registration; Authentication; Registration; Subscriber Management and Short Message Service Handling. Queries from an MSC can be fed serially into the single processor when the system is small (small number of subscribers). As the system grows and the number of subscriber increases more than one query processor (QP) will be required, and each will not be able to handle all of the PD and TD, hence each QP will only have limited information, such as that relating to the PD and TD of a particular group of subscribers. In this case, means such as a central clearing house will need to precede the QP's so that the relevant QP can be addressed for each query. With further growth in the number of subscribers, the central clearing house approach results in an unacceptable processing bottleneck, since all queries must be routed through it. An alternative would be to have more than one central clearing house i.e. more than one HLR, however this then involves changes to the method by which individual subscribers are identified, in particular all of the subscribers IMSI (International Mobile Subscribers Identity) numbers would need to be changed. The IMSI is a radio path subscriber identity (of up to 15 digits) which is used during signalling transactions between the mobile station and the fixed network to identify uniquely each mobile subscriber. It is formatted as Home Country Code (CC)+PLMN Code+HLR Code+Subscriber Number in the HLR SI. The Mobile subscriber may also be identifiable through another key, such as the Mobile Subscriber Integrated Services Digital Network (MSISDN) number. Each mobile subscriber then has an IMSI through which it is uniquely identifiable together with, for example, a number of MSISDN numbers, each of which provides access to the mobile subscriber for a specific type of call (voice, fax, etc.) All MSISDN numbers associated with a mobile subscriber are resolved to its IMSI within the HLR. This information is loaded into the HLR by the service operator.

It is an object of the present invention to provide an HLR which is able to grow from a very small data base to a very large data base without involving central clearing house functions and their associated bottlenecks.

SUMMARY OF THE INVENTION

According to one aspect of the present invention there is provided a communications system query processing element including a plurality of application processors, wherein first data relating to a plurality of subscribers to the system is available at all application processors and second data relating to the plurality of subscribers is partitioned between the application processors, which first data is used by any said application processor receiving a transaction request firstly to determine the application processor which contains the second data of the relevant subscriber and secondly to retransmit the transaction request to the determined application processor without further involvement.

According to another aspect of the present invention there is provided a communications system query processing element including a peripheral processor, a plurality of application processors and a transaction bus via which the peripheral and application processors can communicate, wherein in use queries, relating to a plurality of system subscribers and which are to be handled by the application processors, are input via the peripheral processor, wherein first data relating to the plurality of subscribers is available at all of the application processors and second data relating to the plurality of subscribers is partitioned between the application processors, and wherein in use the peripheral processor serves to direct each query to an available application processor and if the query is not received by the application processor holding the second data relating to the subscriber originating the query, the query is redirected, by the receiving application processor to the application processor holding that second data, via the transaction bus.

According to a further aspect of the present invention there is provided a home location register for a mobile communications system, the register including a plurality of query processors, and wherein permanent data relating to a plurality of subscribers to the system is available at all query processors and temporary data relating to the plurality of subscribers is partitioned between said query processors, further including a peripheral processor and a transaction bus via which the peripheral and query processors can communicate, queries being input to the register via the peripheral processor, and wherein in use the peripheral processor serves to direct each query to an available query processor and if a query is received by a query processor other than that holding the temporary data relating to the subscriber originating the query it is redirected to the query processor holding that temporary data via the transaction bus.

BRIEF DESCRIPTION OF THE DRAWINGS

Embodiments of the present invention will now be described with reference to the accompanying drawings, in which.

DESCRIPTION OF THE PREFERRED EMBODIMENTS

Figure 1:
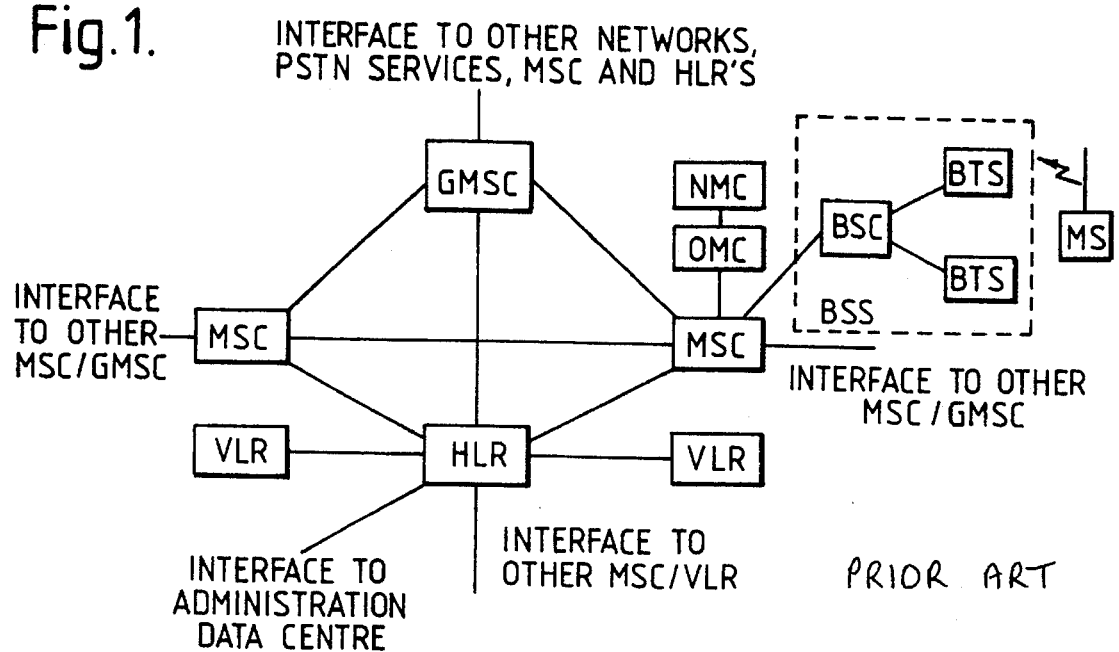
FIG. 1 illustrates a basic GSM network (prior art)
Figure 2:
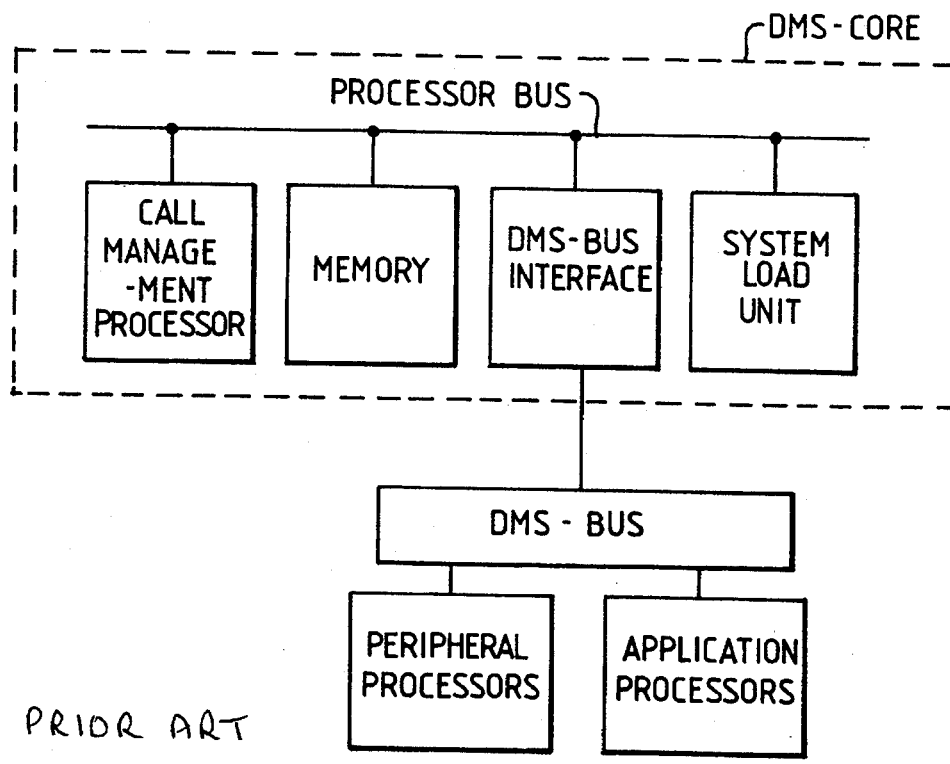
FIG. 2 illustrates a known basic DMS SuperNode architecture (prior art)
Figure 3:
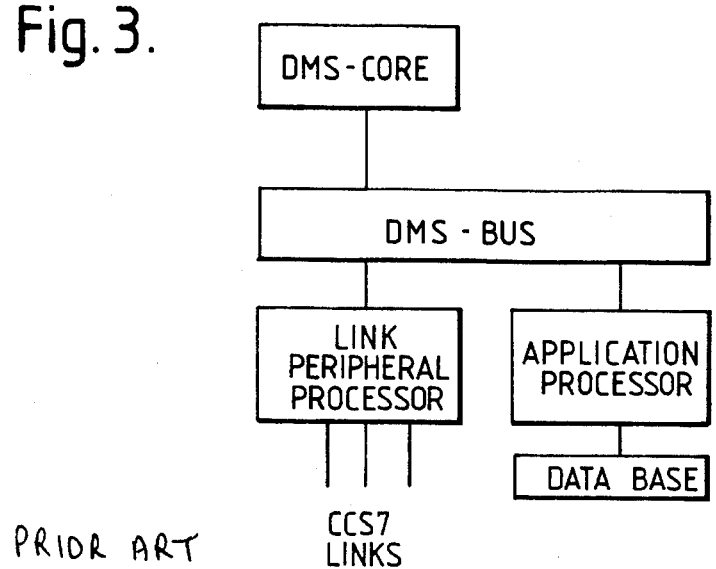
FIG. 3 illustrates a known basic DMS-SCP architecture (prior art)
Figure 4:
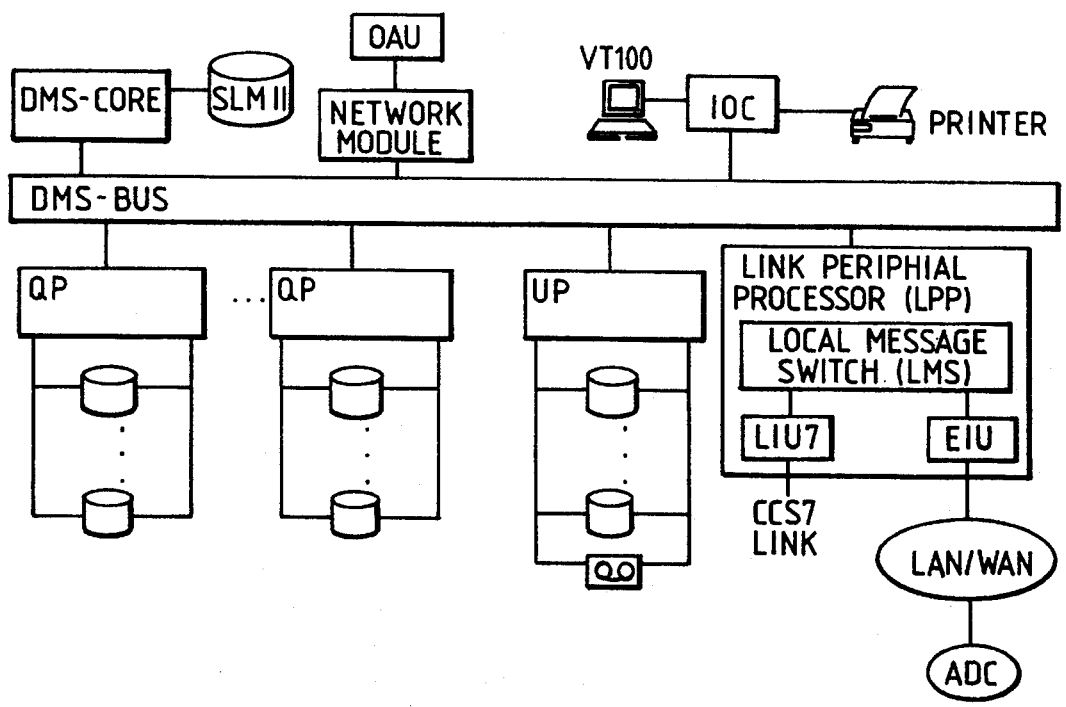
FIG. 4 illustrates more specifically a DMS-SCP architecture usable for HLR applications.

A type of conventional central office switching system for non-mobile subscribers is that referred to as DMS (Digital Multiplex System) SuperNode, the basic architecture of which is illustrated in FIG. 2. The DMS core is a high capacity, computing and memory resource which performs overall system management and control. It contains a processor bus, a call management processor, memory, system load unit and a DMS Bus interface. The DMS Bus is a high speed transaction bus which acts as a hub for inter processor communications. The DMS Bus supports multiple processors (peripheral processors and application processors) and allows them to communicate with each other as well as with the DMS core. See for example EP-A2-0282197 regarding the DMS Bus. This capability of the DMS Bus makes possible the integration of network elements such as in a Service Control Point (SCP) application. FIG. 3 shows a basic example of a DMS-SCP. A more specific architecture which includes one or more (two as shown) file (query) processors QP, a file (update) processor UP and a link peripheral processor LPP and is referred to as DMS-SCP II is shown in FIG. 4. This can be used as an HLR as will be apparent from the following. The LPP includes a local message switch LMS, link interface units referred to as LIU7 since they are connected to the CCS7 signalling network and an Ethernet interface unit (EIU) whereby it may be connected to local area or wide area numbers (LAN/WAN) and an administration data center (ADC).

The role of the update processor UP is: to receive administration directed changes, additions and deletions to administration controlled subscriber data (permanent data); to maintain a highly reliable master copy of all subscriber permanent data; and to distribute this data (or changes) to the query processors in a reliable manner and in near real time. Each query processor maintains a copy of this data.

The role of the query processor is to process per subscriber transactions either as initiated from other nodes in the CCS7 network due to subscriber related activity, or in response to administration or system recovery initiated activities.

The update processor and each query processor are capable of storing a database relating to several million subscribers. The DMS-BUS is capable of transmitting messages at a rate that will also support several million subscribers. The LIU7s (the interface to the CCS7 network) are provisionable and in plurality also provide capacity to support several million subscribers.

The factor that limits system capacity is the processing power of the query processor. Due to the real-time intensive nature of network initiated transactions, the processing capability of a plurality of query processors is required in order to support even a million subscribers.

The major technical challenge with a multiple query processor configuration is the existence of temporary data associated with each subscriber. Temporary data reflects such dynamic attributes as the location of a mobile subscriber or the subscriber's modification to subscription information, for example call forwarding parameters. This data is temporary in that it can be recovered by the network or the subscriber without administration intervention, but it must nevertheless be maintained and stored reliabily to present an appropriate grade of service to the individual subscriber. The main characteristic of this data is that it is modified in real time as part of its query processing function, based upon non-deterministic subscriber activity, such as mobility. Even an average rate of one update per hour per subscriber, which is not unreasonable in a mobile cellular application, represents a significant processing load for a system when the system holds a million subscribers.

In order to perform a transaction (with respect to a single subscriber) the query processor performing this transaction must have access to the currently valid temporary data for the subscriber. In order to support multiple query processors, either the temporary data for all subscribers must be available to all query processors, or at any instant each subscriber must be associated with a unique query processor which maintains that subscriber's temporary data. The former approach leads to a system bottleneck at high capacity. The latter approach provides linear incremental capacity growth through the addition of query processors.

The present invention is thus based on providing the temporary data relating to a sub-group of subscribers to a single query processor, which single processor knows all of the permanent data associated with all of the subscribers. The temporary data is thus partitioned and associated with particular query processors rather than distributed to all of them.

There is however more than one possible entry point of CCS7 messages to the system and the link interface units (LIU7) which provide these entry points are not capable of determining from the incoming message to which query processor the message should be addressed. They are simply interface units and have limited intelligence. Whilst intelligence could be provided thereat in order to achieve appropriate routing this would be contrary to a basic premise behind the invention of achieving an HLR which can grow in a linear incremental manner in both terms of access and numbers of query processors as the number of subscribers increases. Whereas only one LIU7 is indicated in FIG. 4 there are in practice a plurality thereof. The use of conventional LIU7s also means that a conventional paradigm can be used and thus costs can be minimised in comparison with developing larger more intelligent L1U7s. Since two keys IMSI and MSISDN with a sparse, fifteen digit address space, are in some cases required to be usable, a map is necessary for the translations. This map occupies a significant storage volume which is impractically stored in a large number of otherwise simple conventional LIU7's. The map can, however, easily be provided at the query processor databases.

In order to ensure that an incoming message is sent to the appropriate query processor the following mechanism is adopted. As mentioned before, all query processors have all of the permanent data for all subscribers, however each query processor only has the temporary data for a respective subgroup of the subscribers. Basically, an incoming message for a query processor is routed at random by the receiving LIU7 to any of the query processors, if the query processor which receives it is not the correct one, the receiving query processor redirects the message to the correct processor, i.e. transactions are handed off from query processor to query processor as appropriate.

Figure 5:
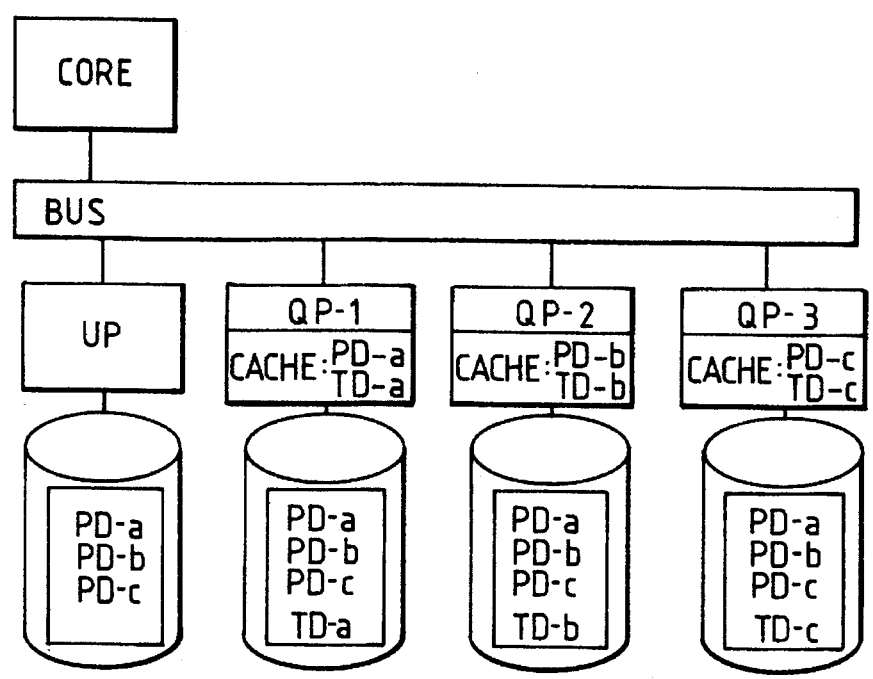
FIG. 5 illustrates an HLR application and indicates partitioning of the temporary data.

FIG. 5 illustrates schematically part of the architecture of an HLR according to the present invention. The core, bus, update and query processors are basically as mentioned above. The permanent data PD-a, PD-b, PD-c for three groups a, b and c of subscribers is stored in the databases of all of the update and query processors UP, QP-1, QP-2, QP-3. However the temporary data for group a is only stored on the database for QP-1, that for group b is on QP-2 and that for group c is on QP-3. The caches of the QPs only contain the records accessed on that QP i.e. for QP-1, the cache contains PD-a and TD-a.

The file processors (query processors) house the disks to store the HLR application databases, implement the query processing functions for one or more HLR applications, and provide access to HLR data for update and administration purposes. In addition to disk, DAT tape devices are utilised for purposes of backing the application database to tape (FIG. 4).

The Super Node Base (FIG. 4) is comprised of the DMS-CORE, DMS-BUS,. IO Controller (IOC), the SLM II disk (System Load Module), the Office Alarms Units (OAU) and a network module. The DMS-CORE provides centralised HLR and CCS7 maintenance; the DMS-BUS provides the messaging medium between the processors (i.e. LIU7s and FPs(QPs); the IOC provides the MAP terminals to maintain the DMS-HLR node and printers for OM and log reporting; the SLM II disk provides storage for the DMS HLR software load and datafill; the OAU provides the audible and visual alarm reporting; the network module connects the OAU to the system.

The architecture of FIG. 5 collocates the TD on the same QP as the PD providing highly efficient access to the TD by the HLR application. Since the TD is partitioned (divided between QPs), whereas the PD is distributed to all QPs, the first message of a transaction must be routed to the correct QP for it to be employed thereat. While this could be partially accomplished in the L1U7, the "hand-off" of a transaction from one QP to another is preferable. Whilst an extra message will be involved, this is the only instance where an extra message is required in a multiple-QP HLR. All subsequent messages of the transaction and all TD accesses are local on the QP. This provides for near-linear capacity growth.

The so-called DMS HLR (based on FIG. 4) may thus be considered to be comprised of Standard SuperNode base components (DMS-CORE, DMS-BUS, IOC), one or more LPPs providing CCS7 network connectivity via LIU7s and Ethernet LAN connectivity via EIUs, one or more FPs providing Query Processing services (QPs) and one FP providing local database maintenance and update handling services (UP). No additional hardware components over that provided by the DMS SCP II base are required.

The QP provides all functions required by the transaction interface including responding to database queries, updating the temporary database and originating new transactions into the network when required. The QP, physically, is a file processor FP which operates in a fully sync-matched mode, manages the storage devices and provides disk shadowing. In a basic version each QP disk stores up to 600 MB of data and a single pair of disks are required to store the HLR database. These disks are configured as a shadow set. Associated with each FP is provisionable memory of which a significant fraction is available for HLR database caching purposes. Use of a cache speeds up query processing since record retrieval from a cache is three to four times faster than retrieval from disk. The query processor memory can be provisioned so that all permanent and temporary data for the subscribers associated with that query processor is resident in the cache memory.

The UP handles the ADC interface and receives batches of updates for the PD from the ADC; provides local update validation and update distribution of QPs configured on the nodes; provides database maintenance functions, such as database backup and restore from disk or tape, coordination of local database audits for the applications and QP database recovery. To provide these capabilities the UP maintains local master copies of the HLR PD database. Physically the UP is a file processor operating in a fully sync-matched mode, managing up to 12 storage devices. All UP disks are deployed in shadowed pairs for reliability and database maintenance purposes.

The LIU7 is a component which terminates the CCS7 links on the HLR. It provides MTP (Message Transfer Part) and SCCP (Signalling Connection Control Part) handling for incoming and outgoing CCS7 messages (i.e. TCAP response, reject or error messages). LIU7s are housed in an LPP cabinet which is connected to the DMS-BUS.

The DMS-CORE provides the central management facilities to maintain an SCP service from a query processing and update handling perspective. It is not directly involved in the query and update handling. Individual QPs and the UP are monitored by the SCP central management processes and any state changes are reflected in the appropriate DMS-MAP level. In case of failure detection, appropriate alarms and logs are generated using standard DMS alarms and log systems. Also, Operational Measurements (OMs) and logs collected on each processor are forwarded to the DMS-CORE for reporting via the standard DMS OM and log reporting mechanism.

The DMS-BUS serves as the messaging backbone of the DMS SCP II. For reliability the DMS-BUS is equipped with cross-links.

The DMS-HLR differs from DMS SCP II basically in that it additionally requires support for temporary data (data that is updated on the QP via the transaction interface) and support for partitioned data, the temporary data is partitioned requiring routing of transactions to the correct QP.

Figure 6:
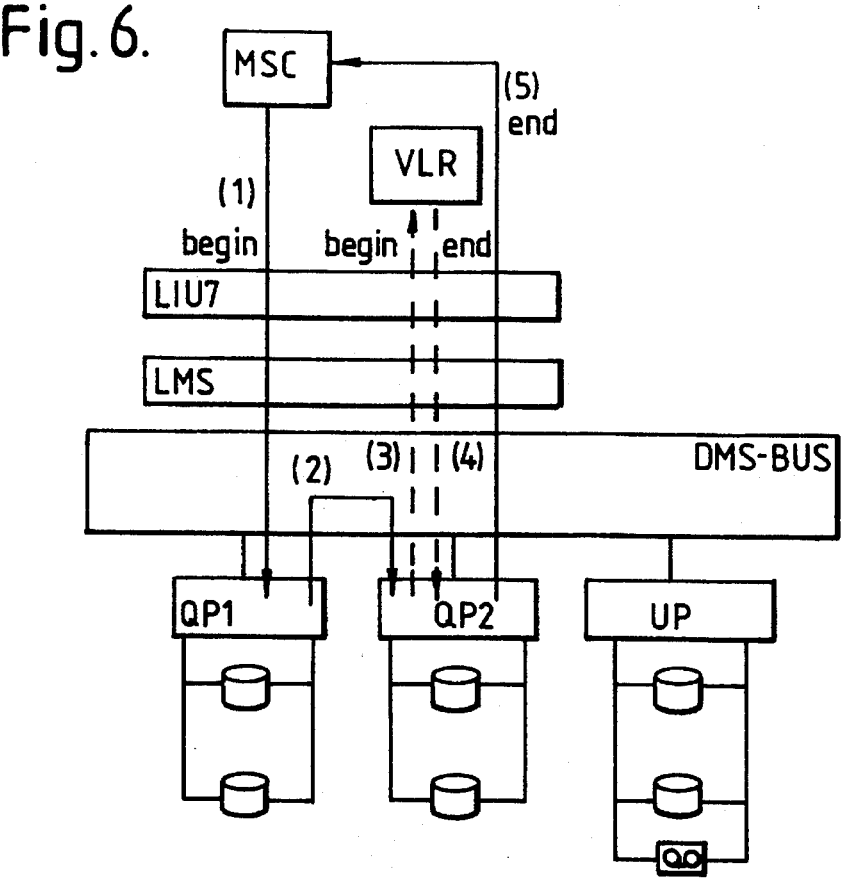
FIG. 6 illustrates an example of query processing using the inventive approach.

Query processing will now be considered in greater detail with reference to FIG. 6. A CCS7 message from the MSC is received at the HLR over a CCS7 link terminating at an LIU7 (1). This is a TCAP BEGIN message (Transaction Capabilities Application Part) for a routing request (sendRoutingInformation). The LIU7 performs the MTP (Message Transfer Part) 1, 2 and 3 and the SCCP (Signalling Connection Control Part) handling of the CCS7 message to verify that the message is destined for this SCP node and that the message being queried is configured and in-service on the node. Since it is the first message of a transaction the LIU7 sends the message to any available QP for application handling of the transaction. Since there may be several QPs providing an SCP application service (as illustrated), the LIU7 performs a selection algorithm to determine which available QP is to handle the query. As a consequence of this invention a simple algorithm such as "round robin" is sufficient, thereby minimising LIU7 routing complexity. Alternatively, more complex routing functions which optimise efficiency of delivery are also permitted. The selected QP (QP1) in this example receives the CCS7 message from LIU7 over the DMS bus and hands its contents over to the HLR application for processing. The application first checks whether the transaction should be handled by this QP (QP1) or forwarded to another QP where the TD relating to this transaction resides. QP forwarding a transaction requires analysis of the key in the receive message. A mapping from key to TD position is used to select the correct QP. The key may be IMSI or MSISDN. Ideally there is no algorithmic relation between the IMSI and MSISDN numbers, so that subscribers can keep their numbers when moving from one home location to another home location. In this example, QP1 forwards the transaction to QP2 (2). Once the transaction has arrived at the correct QP the application decodes the TCAP information and performs the appropriate database operations. The forwarded message received at the QP is treated the same as if it is a network transaction.

Some HLR services require the creation of a new transaction. The original transaction is held until the second one is complete. In the example shown, which is an enhanced routing algorithm by the LIU7 over the "round robin" arrangement, part of the sendRoutingInformation procedure the HLR must initiate a second TCAP transaction with the VLR to acquire the mobile station's current roaming number (MSRN). The application encodes the associated provideRoamingNumber, assigns a Transaction ID to the TCAP BEGIN message and sends it via an available LIU7 to the VLR (3). The response received from the VLR is a TCAP END message carrying the same transaction ID as the originating BEGIN message. This ID is then used by the LIU7 to identify the target QP (QP2) and route the message (4). While the LIU7 cannot route BEGIN messages, it can route messages with a transaction ID that contains a QP number. The sendRoutingInformation procedure in the target QP receives the TCAP END message from the VLR, extracts the MSRN and completes its processing. Finally it encodes a response to the MSC, as a TCAP END Message and sends it via an available LIU7 (5), and closes down the transaction.

As will be appreciated from the above the HLR architecture proposed enables the database to grow from being very small to very large by the addition of extra query processors as appropriate. Each query processor knows the permanent data associated with all subscribers but only the temporary data associated with certain of the subscribers. If a query arrives at the wrong processor it will be redirected to the appropriate processor via the DMS Bus (message bus). The growth potential in terms of the number of subscribers supported is thus linear with respect to the number of query processors. Additional LIU7 interfaces can also be added in a linear manner to cope with increased subscribers i.e. query rates. The fact that only part of the temporary data is contained on the data base at one query processor means that the mapping can be moved in near-real time from one QP to another, so that, if necessary, plans can be made to remove an entire query processor from the service without affecting system performance, or load can be balanced across the system.

With the system as proposed there is no bottleneck likely to arise as in the case of the central clearing house solution for covering increasing numbers of subscribers. With the proposed solution of n query processors and a simple random initial routing of transactions by the LIU7s, there is a 1/n chance that a message will be routed to the correct query processor. Thus there is an (n−1)/n chance that a message will be handled by two query processors, which approaches certainty in large systems. As this initial routing represents a small fraction of the total processing required to handle a transaction, the worst case (certainty) can be used to engineer the system and the subscriber capacity is then engineered completely linearly with the addition of LIU7s to handle physical termination of CCS7 links and query processors to handle transaction processing. More complex routing functions may be deployed to reduce this overhead further.

An HLR architecture as proposed above can handle over 1,000,000 subscribers, whilst starting out with fewer than 20,000, the additional capacity being by incremental plug-in provisions of query processors and LIU7s. This is thus a particularly cost effective solution to handle system expansion. Whereas two keys IMSI and MSISDN were referred to above, which keys are disassociated, the system will also work with just one key type.

Whilst the invention has been specifically described in terms of a home location register for mobile communications, it is equally applicable to any communications system query processing element including a plurality of application processor and where there are two "types" of data.

We claim:

1. A home location register (HLR) for a mobile communications system and adapted to provide subscriber information in response to received requests, the register comprising a plurality of query processors, data storage means one associated with each said query processor, an update processor for updating data stored in said storage means, a peripheral processor incorporating a local message switch and having means for receiving requests for subscriber transactions and for relaying each request via the switch to a said query processor, a transaction bus via which the query processors and the peripheral processor can communicate and via which said requests are routed, wherein each said query processor is associated with a respective group of system subscribers, wherein a set of data is associated with each said subscriber, said data comprising permanent data and temporary data, wherein each said data storage means comprises a first store containing the permanent data relating to all subscribers and a second store containing the temporary data relating to the group of subscribers associated with the query processor corresponding to that data storage means, wherein said received requests are allocated each to an available query processor on an essentially random basis, and wherein each said query processor has means for processing requests relating to subscribers in the group associated with that query processor and for forwarding requests relating to subscribers not in that group each to the respective query processor whose group contains the subscriber.

2. A home location register as claimed in claim 1, wherein the requests are applied to the peripheral processor via signalling links, the peripheral processor incorporating a plurality of line interface units for said signalling links.

3. A home location register as claimed in claim 2, wherein each said query processor has an associated cache memory containing the temporary and permanent data relating to those subscribers in the group associated with that processor.

4. A method of request or query processing in a mobile communications system home location register (HLR) so as to provide subscriber information in response to received requests, the register incorporating a plurality of query processors each having a respective data storage means associated therewith, the method including partitioning the system subscribers into groups, associating said groups each with a respective said query processor, providing at each said query processor data storage means first data comprising permanent data relating to every system subscriber and second data comprising temporary data relating to the group of subscribers associated with that query processor, allocating said received requests each to an available query processor on an essentially random basis, processing at each said query processor those requests relating to subscribers in the group associated with that query processor, and forwarding requests relating to subscribers not in that group each to the respective query processor whose group contains the subscriber.

5. A method as claimed in claim 4, wherein the temporary and permanent data relating to a said group of subscribers is stored in a cache memory associated with the query processor corresponding to that group.

* * * * *